United States Patent
Hiratsuka et al.

(10) Patent No.: US 12,537,195 B2
(45) Date of Patent: Jan. 27, 2026

(54) POSITIVE ELECTRODE ACTIVE MATERIAL FOR NON-AQUEOUS ELECTROLYTE SECONDARY BATTERIES, AND NON-AQUEOUS ELECTROLYTE SECONDARY BATTERY

(71) Applicant: SANYO Electric Co., Ltd., Daito (JP)

(72) Inventors: Hidekazu Hiratsuka, Hyogo (JP); Hiroki Watanabe, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 857 days.

(21) Appl. No.: 17/764,574

(22) PCT Filed: Jul. 21, 2020

(86) PCT No.: PCT/JP2020/028208
§ 371 (c)(1),
(2) Date: Mar. 29, 2022

(87) PCT Pub. No.: WO2021/065162
PCT Pub. Date: Apr. 8, 2021

(65) Prior Publication Data
US 2022/0384806 A1 Dec. 1, 2022

(30) Foreign Application Priority Data

Oct. 4, 2019 (JP) ................. 2019-183450

(51) Int. Cl.
*H01M 4/525* (2010.01)
*H01M 4/485* (2010.01)
(Continued)

(52) U.S. Cl.
CPC ........... *H01M 4/525* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

| 2010/0081055 A1* | 4/2010 | Konishi | ............ H01M 10/0525 429/223 |
| 2011/0129734 A1 | 6/2011 | Konishi et al. | |

(Continued)

FOREIGN PATENT DOCUMENTS

| CN | 102082269 A | 6/2011 |
| CN | 110073530 A | 7/2019 |

(Continued)

OTHER PUBLICATIONS

Machine translation of WO 2010/134156 A1.*

(Continued)

*Primary Examiner* — Jonathan G Leong
*Assistant Examiner* — Tony S Chuo
(74) *Attorney, Agent, or Firm* — WHDA, LLP (57) ABSTRACT

Each of the Ni-containing lithium-based complex oxide A and the Ni-containing lithium-based complex oxide B contains Ni in an amount of 55 mol % or more relative to the total number of moles of metal elements excluding Li, the Ni-containing lithium-based complex oxide A has an average primary particle diameter of 2 μm or more, an average secondary particle diameter of 2 to 6 μm, a particle fracture load of 5 to 35 mN and a BET specific surface area of 0.5 m2/g to 1.0 m2/g, and the Ni-containing lithium-based complex oxide B has an average primary particle diameter of 1 μm or less, an average secondary particle diameter of 10 to 20 μm, a particle fracture load of 10 to 35 mN and a BET specific surface area of 0.1 m2/g to 1.0 m2/g.

4 Claims, 2 Drawing Sheets

(51) Int. Cl.
*H01M 4/505* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2015/0221934 A1 | 8/2015 | Hiratsuka et al. | |
| 2017/0187031 A1* | 6/2017 | Kurita | H01M 10/0525 |
| 2017/0207455 A1 | 7/2017 | Watanabe et al. | |
| 2018/0316005 A1* | 11/2018 | Shin | H01M 4/0471 |
| 2019/0097226 A1 | 3/2019 | Kawasaki et al. | |
| 2021/0135210 A1 | 5/2021 | Kawakita et al. | |
| 2021/0265627 A1 | 8/2021 | Hiratsuka | |

FOREIGN PATENT DOCUMENTS

| | | |
|---|---|---|
| JP | 2004-355824 A | 12/2004 |
| JP | 2011-113825 A | 6/2011 |
| JP | 2015-164119 A | 9/2015 |
| JP | 2017-102995 A | 6/2017 |
| JP | 2019-67506 A | 4/2019 |
| KR | 10-2018-0121484 A | 11/2018 |
| WO | 2010/134156 A1 | 11/2010 |
| WO | 2014/133064 A1 | 9/2014 |
| WO | 2020/003642 A1 | 1/2020 |

OTHER PUBLICATIONS

Office Action dated Nov. 22, 2023, issued in counterpart CN Patent Application No. 202080068028.2, with English translation. (17 pages).
Office Action dated Mar. 20, 2024, issued in counterpart CN Application No. 202080068028.2, with English translation. (19 pages).
International Search Report date Oct. 6, 2020, issued in counterpart Application No. PCT/JP2020/028208, with English Translation. (5 pages).
Written Opinion date Oct. 6, 2020, issued in counterpart Application No. PCT/JP2020/028208. (4 pages).
Extended (Supplementary) European Search Report dated Nov. 3, 2022, issued in counterpart EP application No. 20871657.1. (7 pages).
Office Action dated Sep. 15, 2022, issued in counterpart IN application No. 202247024545. (6 pages).

* cited by examiner

POSITIVE ELECTRODE ACTIVE MATERIAL FOR NON-AQUEOUS ELECTROLYTE SECONDARY BATTERIES, AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/028208 filed on Jul. 21, 2020 which claims the benefit of priorities under 35 U.S.C. § 119(a) of Japanese Patent Application No. 2019-183450 filed in Japan on Oct. 4, 2019, the contents of which are incorporated herein by reference.

TECHNICAL FIELD

The present disclosure relates to a positive electrode active material for a non-aqueous electrolyte secondary battery, and a non-aqueous electrolyte secondary battery.

BACKGROUND

In recent years, Ni-containing lithium composite oxides with high Ni content have been attracting attention as positive electrode active materials for a non-aqueous electrolyte secondary battery that significantly contribute to an increased battery capacity. A positive electrode in which two positive electrode active materials having different average particle sizes are used in combination has also been known (see, for example, Patent Literature 1). In this case, the packing density of the active materials in the positive electrode mixture layer can be increased through a combination of smaller particles and larger particles between which the particle size difference is large, achieving a further increased battery capacity.

CITATION LIST

Patent Literature

PATENT LITERATURE 1: Japanese Unexamined Patent Application Publication No. 2011-113825

SUMMARY

In non-aqueous electrolyte secondary batteries, particle breakage may occur due to expansion and shrinkage of positive electrode active material particles in response to charge/discharge, causing deterioration of cycle characteristics. Suppressing the occurrence of particle breakage in both of the smaller particles and the larger particles to hinder the deterioration of the capacity is an important goal. The technique disclosed in Patent Literature 1 does not take into consideration hindering the deterioration of cycle characteristics, and still has room for improvement.

According to an aspect of the present disclosure, a positive electrode active material for a non-aqueous electrolyte secondary battery comprises a Ni-containing lithium composite oxide A and a Ni-containing lithium composite oxide B. The Ni-containing lithium composite oxide A and the Ni-containing lithium composite oxide B contain Ni in an amount of 55 mol % or more relative to the total number of moles of one or more metal elements excluding Li, the Ni-containing lithium composite oxide A has an average primary particle size of 2 μm or greater, an average secondary particle size of 2 μm to 6 μm, a particle breaking load of 5 mN to 35 mN, and a BET specific surface area of 0.5 $m^2$/g to 1.0 $m^2$/g, and the Ni-containing lithium composite oxide B has an average primary particle size of 1 μm or less, an average secondary particle size of 10 μm to 20 μm, a particle breaking load of 10 mN to 35 mN, and a BET specific surface area of 0.1 $m^2$/g to 1.0 $m^2$/g.

According to an aspect of the present disclosure, a non-aqueous electrolyte secondary battery comprises a positive electrode containing the above-described positive electrode active material; a negative electrode; and a non-aqueous electrolyte.

According to an aspect of the present disclosure, the positive electrode active material can provide a non-aqueous electrolyte secondary battery with high capacity and good cycle characteristics.

DESCRIPTION OF EMBODIMENTS

While, as described above, the combined use of two Ni-containing lithium composite oxides having different average particle sizes significantly contributes to an increased battery capacity, it is not easy to suppress the occurrence of particle breakage in both of smaller particles and larger particles to hinder the deterioration of the capacity. After diligent effort to achieve this goal, the present inventors have succeeded in suppressing the occurrence of particle breakage in smaller particles and larger particles through respective different mechanisms. The particle breaking strength of smaller particles having an average secondary particle size of 2 μm to 6 μm can be increased to 5 mN to 35 mN by increasing the primary particle size to 2 μm or greater and thereby reducing the BET specific surface area to 0.5 $m^2$/g to 1.0 $m^2$/g. The particle breaking strength of larger particles having an average secondary particle size of 10 μm to 20 μm can be increased to 10 mN to 35 mN by reducing the primary particle size to 1 μm or less and thereby reducing the BET specific surface area to 0.1 $m^2$/g to 1.0 $m^2$/g while increasing the contact area between primary particles. A non-aqueous electrolyte secondary battery with high capacity and good cycle characteristics can be achieved through the combined use of smaller particles and larger particles of Ni-containing lithium composite oxides in which the particle breaking load is high and the occurrence of particle breakage is hindered.

An example embodiment of a positive electrode active material and a non-aqueous electrolyte secondary battery according to the present disclosure will be described in detail below.

Figure 1:
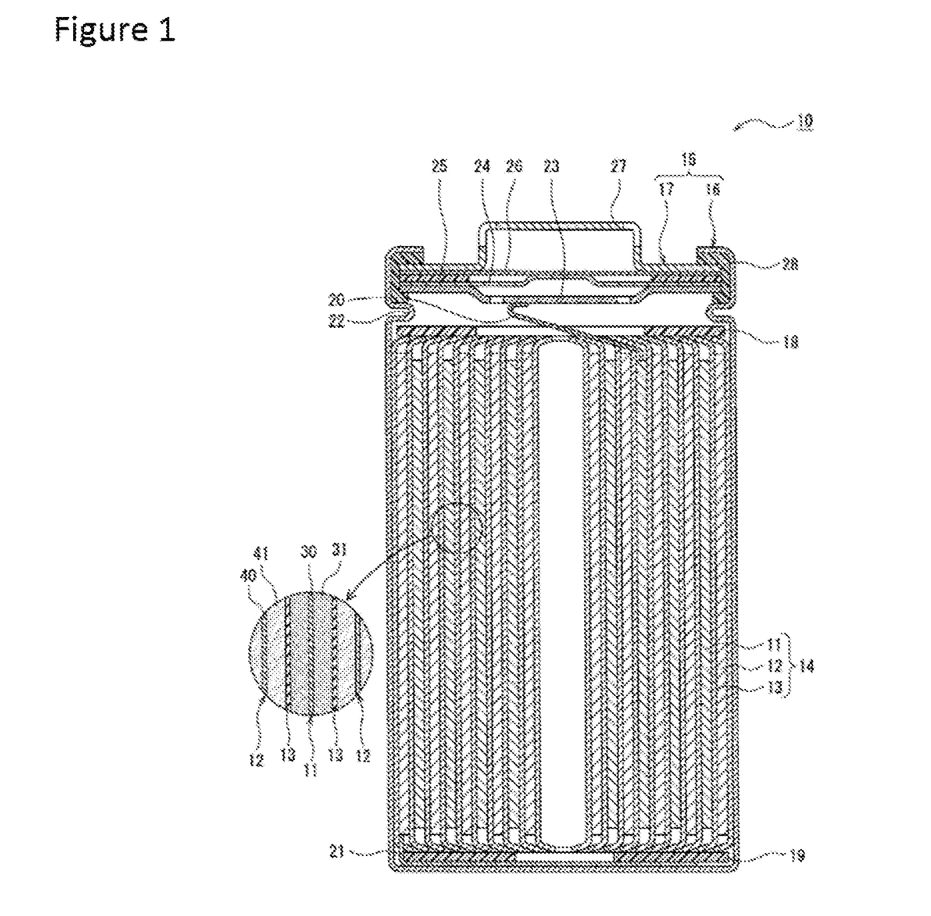
FIG. 1 is a cross-sectional view of a non-aqueous electrolyte secondary battery according to an example embodiment.

Although a cylindrical battery including a wound electrode assembly 14 housed in a battery case 15 having a cylindrical shape is described by way of example in connection with an embodiment below, the battery case is not limited to those having a cylindrical shape and may have, for example, a rectangular, coin, or another shape, and the battery case may be composed of a laminate sheet including a metal layer and a resin layer. The electrode assembly is not limited to those having a wound configuration and may be a laminated electrode assembly including a plurality of positive electrodes and a plurality of negative electrodes alternately laminated with a separator therebetween.

FIG. 1 is a cross-sectional view of a non-aqueous electrolyte secondary battery 10 according to an example embodiment. As illustrated in FIG. 1, the non-aqueous electrolyte secondary battery 10 includes the wound electrode assembly 14, a non-aqueous electrolyte (not illustrated), and the battery case 15 that houses the electrode assembly 14 and the non-aqueous electrolyte. The electrode assembly 14 has a wound configuration in which a positive electrode 11 and a negative electrode 12 are wound with a separator 13 therebetween. The battery case 15 includes an outer can 16 having a cylindrical shape with a closed bottom and a sealing assembly 17 covering the opening of the outer can 16. The non-aqueous electrolyte secondary battery 10 also includes a resin gasket 28 that is disposed between the outer can 16 and the sealing assembly 17.

The electrode assembly 14 is composed of the positive electrode 11 having an elongated shape, the negative electrode 12 having an elongated shape, two separators 13 having an elongated shape, a positive electrode tab 20 joined to the positive electrode 11, and a negative electrode tab 21 joined to the negative electrode 12. To prevent precipitation of lithium, the negative electrode 12 has a size slightly larger than the positive electrode 11. More specifically, the negative electrode 12 has longer lengths than the positive electrode 11 both in the length direction and in the width direction (shorter length direction). The two separators 13 have a size slightly larger than at least the positive electrode 11 and is, for example, disposed so that the positive electrode 11 is interposed between them.

Insulating plates 18 and 19 are respectively disposed on upper and lower sides of the electrode assembly 14. In the example illustrated in FIG. 1, the positive electrode tab 20 attached to the positive electrode 11 passes through a through hole in the insulating plate 18 and extends toward the sealing assembly 17, and the negative electrode tab 21 attached to the negative electrode 12 passes outside the insulating plate 19 and extends toward the bottom of the outer can 16. The positive electrode tab 20 is connected to an underside of a bottom plate 23 of the sealing assembly 17 by, for example, welding, and a cap 27 that is the top plate of the sealing assembly 17 electrically connected to the bottom plate 23 serves as a positive electrode terminal. The negative electrode tab 21 is connected to an inner surface of the bottom of the outer can 16 by, for example, welding, and the outer can 16 serves as a negative electrode terminal.

The outer can 16 is, for example, a metal container having a cylindrical shape with a closed bottom. As described above, the gasket 28 is provided between the outer can 16 and the sealing assembly 17, thereby hermetically sealing the space inside the battery case 15. The outer can 16 has a groove or inward projection 22 for supporting the sealing assembly 17, the groove or inward projection 22 being formed by, for example, pressing the side surface of the outer can 16 from the outside. The groove or inward projection 22 preferably has an annular shape extending along the circumference of the outer can 16, and supports the sealing assembly 17 on its upper surface. An upper end portion of the outer can 16 is bent inwardly and swaged to the periphery of the sealing assembly 17.

The sealing assembly 17 has a configuration in which the bottom plate 23, a lower vent member 24, an insulating member 25, an upper vent member 26, and the cap 27 are stacked in that order from the side on which the electrode assembly 14 is located. The components of the sealing assembly 17 have, for example, either a disc shape or a ring shape and are, except for the insulating member 25, electrically connected to each other. The lower vent member 24 and the upper vent member 26 are connected to each other at their center portions, and the insulating member 25 is interposed between their peripheral portions. In response to an increase in internal pressure of the battery due to abnormal heat generation, the lower vent member 24 breaks as it is deformed so as to push the upper vent member 26 toward the cap 27, resulting in an interruption of the current path between the lower vent member 24 and the upper vent member 26. In response to a further increase in internal pressure, the upper vent member 26 breaks, letting gas escape through an opening of the cap 27.

The positive electrode 11, the negative electrode 12, the separator 13, and the non-aqueous electrolyte of the non-aqueous electrolyte secondary battery 10, and, in particular, the positive electrode active material contained in the positive electrode 11 will be described in detail below.

Positive Electrode

The positive electrode 11 includes a positive electrode collector 30 and positive electrode mixture layers 31 that are formed on both sides of the positive electrode collector 30. Examples of the positive electrode collector 30 include foil of metal that is stable in a potential range of the positive electrode 11, such as aluminum or an aluminum alloy, and a film having such metal disposed in its surface layer. The positive electrode mixture layers 31 contain a positive electrode active material, a conductive material, and a binder. The thickness of the positive electrode mixture layer 31 formed on each side of the collector is, for example, 10 µm to 150 µm. The positive electrode 11 can be prepared by applying positive electrode mixture slurry containing, for example, a positive electrode active material, a conductive material, and a binder, to the positive electrode collector 30, drying the coating, and then compressing it to form the positive electrode mixture layers 31 on both sides of the positive electrode collector 30.

Examples of the conductive material contained in the positive electrode mixture layers 31 include carbon materials such as carbon black, acetylene black, Ketjen black, and graphite. Examples of the binder contained in the positive electrode mixture layers 31 include polyetrafluoroethylene (PTFE), polyvinylidene fluoride (PVdF), and other fluorocarbon resins, polyacrylonitrile (PAN), polyimides, acrylic resins, and polyolefins. One or more of these resins may be used in combination with, for example, carboxymethylcellulose (CMC) or a salt thereof, or polyethylene oxide (PEO).

The positive electrode mixture layers 31 contain two Ni-containing lithium composite oxides A and B as the positive electrode active material, the Ni-containing lithium composite oxides A and B having average primary particle sizes and average secondary particle sizes that are different from each other. The Ni-containing lithium composite oxides A and B are composite oxides that contain at least Li and Ni. It should be noted that the positive electrode mixture layers 31 may contain other positive electrode active materials besides the Ni-containing lithium composite oxides A and B without deviating from the intent of the present disclosure, but, in an embodiment herein, contain only the Ni-containing lithium composite oxides A and B as the positive electrode active material.

Figure 2A:
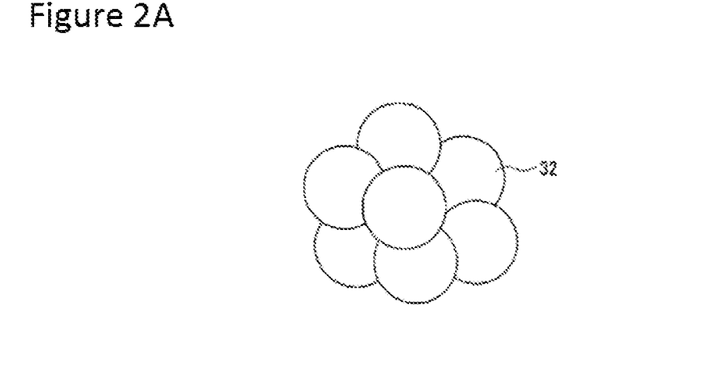
FIG. 2A schematically illustrates a Ni-containing lithium composite oxide A according to an example embodiment.
Figure 2B:
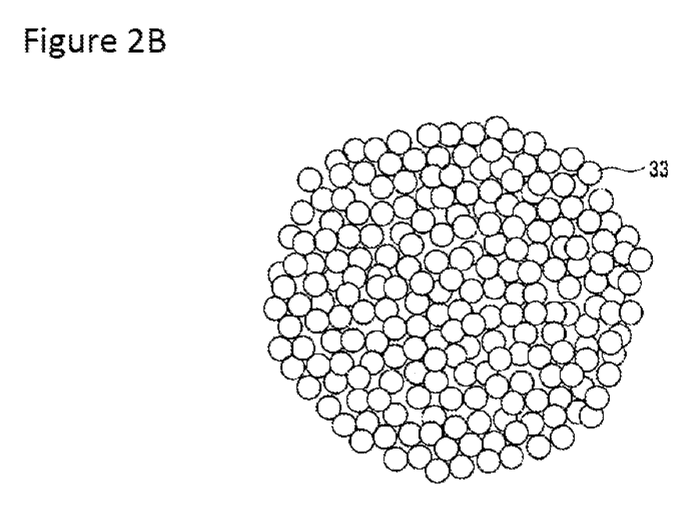
FIG. 2B schematically illustrates a Ni-containing lithium composite oxide B according to an example embodiment.

FIG. 2A schematically illustrates the Ni-containing lithium composite oxide A, and FIG. 2B schematically illustrates the Ni-containing lithium composite oxide B. As illustrated in FIGS. 2A and 2B, the Ni-containing lithium composite oxides A and B comprise secondary particles that are aggregates of primary particles 32 and 33, respectively. The Ni-containing lithium composite oxide A (secondary particle) has a smaller particle size than that of the Ni-containing lithium composite oxide B (secondary particle). However, the primary particles 32 that form the Ni-containing lithium composite oxide A are larger than the primary particles 33 that form the Ni-containing lithium composite oxide B. By using the Ni-containing lithium composite oxides A and B in combination, the packing density of the positive electrode active material in the positive electrode mixture layers 31 can be increased, achieving an increased capacity of the battery while the battery having good cycle characteristics.

Each of the Ni-containing lithium composite oxides A and B contains Ni in a ratio of 55 mol % or more, preferably 80 mol % or more, and more preferably 85 mol % or more relative to the total number of moles of one or more metal elements excluding Li. The Ni-containing lithium composite oxides A and B may contain an element other than Li and Ni, and contain at least one element selected from, far example, Co, Mn, Mg, Zr, Mo, W, Al, Cr, V, Ce, Ti, Fe, Si, K, Ga, In, B, Ca, and Na. The Ni-containing lithium composite oxides A and B contain at least one of Co and Mn and preferably at least Co, and contain at least one metal element selected from Mg, Zr, Mo, W, Al, Cr, V, Ce, Ti, Fe, K, Ga, In, and B.

A suitable example of the Ni-containing lithium composite oxides A and B is a composite oxide represented by a general formula $Li_\alpha Ni_x Co_y M_{(1-x-y)} O_2$ (where $1.00 \leq \alpha \leq 1.15$, $0.8 \leq x < 1.0$, $0 \leq y \leq 0.3$, and M represents an element other than Li, Ni, and Co). In the formula above, M represents at least one element selected from, for example, Mn, Mg, Zr, Mo, W, Nb, Al, Cr, V, Ce, Ti, Fe, Si, K, Ga, In, B, Ca, and Na. The Ni-containing lithium composite oxides A and B may have substantially the same composition.

The primary particles 32 of the Ni-containing lithium composite oxide A have an average particle size (hereinafter sometimes referred to as "average primary particle size A") of 2 μm or greater, and the secondary particles of the Ni-containing lithium composite oxide A have an average particle size (hereinafter sometimes referred to as "average secondary particle size A") of 2 μm to 6 μm. The primary particles 32 of the Ni-containing lithium composite oxide B have an average particle size (hereinafter sometimes referred to as "average primary particle size B") of 1 μm or less, and the secondary particles of the Ni-containing lithium composite oxide B have an average particle size (hereinafter sometimes referred to as "average secondary particle size B") of 10 μm to 20 μm. By using the Ni-containing lithium composite oxides A and B that satisfy the above-described average primary particle size and average secondary particle size requirements and that satisfy predetermined particle breaking load and BET specific surface area requirements which will be described below, the occurrence of particle breakage in the Ni-containing lithium composite oxides A and B can be hindered, thereby improving the cycle characteristics of the battery.

The average primary particle size A of the Ni-containing lithium composite oxide A is preferably 2 μm to 6 μm and more preferably 3 μm to 5 μm. The average primary particle size B of the Ni-containing lithium composite oxide B is preferably 0.1 μm to 1 μm and more preferably 0.2 μm to 0.7 μm. With the average primary particle sizes A and B that fall within these ranges, the cycle characteristics of the battery can be further improved.

The average primary particle sizes A and B are determined by analyzing SEM images of cross sections as observed using a scanning electron microscope (SEM). For example, a positive electrode is embedded in a resin, a cross section of a positive electrode mixture layer is prepaid through, for example, a Cross Section Polisher (CP) process, and an image of this cross section is captured using an SEM. Alternatively, powder of the Ni-containing lithium composite oxides A and B is embedded in a resin, a composite oxide particle cross section is prepared through, for example, a CP process, and an image of this cross section captured using an SEM. From this cross-section SEM image, 30 primary particles are randomly chosen. The grain boundaries of the chosen 30 primary particles are observed to identify the outer geometries of the primary particles and then the longitudinal diameter (maximum diameter) of each of the 30 primary particles is determined to obtain an average value thereof as the average primary particle size A or B.

The average secondary particle sizes A and B are also determined from the above-described cross-section SEM image. Specifically 30 secondary particles (Ni-containing lithium composite oxide A or B) are randomly chosen from the above-described cross-section SEM image, the grain boundaries of the chosen 30 secondary particles are observed to identify the outer geometries of the secondary particles, and then the longitudinal diameter (maximum diameter) of each of the 30 secondary particles is determined to obtain an average value thereof as the average particle size of the secondary particles.

The particle breaking load of the Ni-containing lithium composite oxide A is 5 mN to 35 mN, and the particle breaking load of the Ni-containing lithium composite oxide B is 10 mN to 35 mN. As a result, the occurrence of particle breakage in the Ni-containing lithium composite oxides A and B can be hindered, thereby improving the cycle characteristics of the battery.

The particle breaking load is measured using a micro compression testing machine (MCT-W201 manufactured by Shimadzu Corporation) under the following measurement conditions. Specifically, the amount of resin particle deformation occurring when a load is applied to one sample particle at the following loading rate and the load are measured, and the load (N) as measured when the sample particle is deformed and has reached its breaking point (at which the displacement begins abruptly increasing) is the particle breaking load.

Particle Breaking Load Measurement Conditions
  Test temperature: room temperature (25° C.)
  Upper pressure indenter: 50 μm diameter flat indenter (made of diamond)
  Lower pressure plate: SKS flat plate
  Measurement mode: compression test
  Test load: 10 mN minimum, 50 mN maximum
  Loading rate: 0.178 mN/sec minimum, 0.221 mN/sec minimum
  Displacement full scale: 10 μm The BET specific surface area of the Ni-containing lithium composite oxide A is 0.5 $m^2/g$ to 1.0 $m^2/g$, and the BET specific surface area of the Ni-containing lithium composite oxide B is 0.1 $m^2/g$ to 1.0 $m^2/g$. As a result, the occurrence of particle breakage in the Ni-containing lithium composite oxides A and B can be hindered, thereby improving the cycle characteristics of the battery. The BET specific surface area can be measured by, for example, a commercially available measuring device such as HM model-1201 manufactured by Macsorb.

The positive electrode mixture layers 31 contain the Ni-containing lithium composite oxide A in an amount of preferably 5% to 60% by mass, more preferably 10% to 55% by mass, and particularly preferably 30% to 50% by mass relative to the mass of the Ni-containing lithium composite oxide B. With the Ni-containing lithium composite oxides A and B mixed at a ratio that falls within these ranges, the battery capacity and the cycle characteristics are easily achieved at the same time.

An example method of manufacturing the Ni-containing lithium composite oxides A and B will be described in detail below.

The Ni-containing lithium composite oxide A is synthesized through a two-step calcination process including a first calcination step of calcining a first mixture that includes a lithium compound and a transition metal compound that contains Ni in an amount of 55 mol % or more and preferably 80 mol % or more, and a second calcination step of calcining a second mixture that includes the calcined product obtained in the first calcination step and a lithium compound. The Ni-containing lithium composite oxide B is synthesized through a calcination process of calcining a mixture that includes a lithium compound and a transition metal compound that contains Ni in an amount of 55 mol % or more and preferably 80 mol % or more.

Synthesis of Ni-Containing Lithium Composite Oxide A

First Calcination Step

The content of Li in the first mixture is preferably 0.7 to 1.1 and more preferably 0.8 to 1.0 in a molar ratio to the total amount of the transition metal. The calcination temperature for the first mixture is preferably 700° C. to 1000° C. and more preferably 750° C. to 900° C. The calcination time is, for example, 3 hours to 10 hours. With, for example, the content of Li in the first mixture and the calcination temperature that fall within these ranges, the average particle sizes of the primary particles and the secondary particles, the particle breaking load, and the BET specific surface area of the Ni-containing lithium composite oxide A are easily adjusted to the above-described ranges.

Examples of the lithium compound contained in the first mixture include $Li_2CO_3$, LiOH, $Li_2O_3$, $Li_2O$, $LiNO_3$, $LiNO_2$, $Li_2SO_4$, $LiOH \cdot H_2O$, LiH, and LiF.

The transition metal compound contained in the first mixture is any compound that contains Ni in an amount of 55 mol % or more and preferably 80 mol % or more without any other particular limitation, but preferably is a compound that contains, in addition to Ni, at least one of Co and Mn in terms of, for example, improving the stability of the crystal structure of the finally obtained Ni-containing lithium composite oxide.

Second Calcination Step

The content of Li in the second mixture is preferably 0.01 to 0.3 and more preferably 0.05 to 0.2 in a molar ratio to the total amount of the transition metal. The calcination temperature for the second mixture is preferably 600° C. to 900° C. and more preferably 700° C. to 800° C. The calcination time is, for example, 5 hours to 20 hours. With, for example, the content of Li in the second mixture and the calcination temperature that fall within these ranges, the average particle sizes of the primary particles and the secondary particles, the particle breaking load, and the BET specific surface area of the Ni-containing lithium composite oxide A are easily adjusted to the above-described ranges. The calcination in the second calcination step is performed, for example, at a lower temperature for a longer time than in the first calcination step.

The lithium compound contained in the second mixture may be the same as or different from the lithium compound contained in the first mixture. Examples of the lithium compound contained in the second mixture include $Li_2CO_3$, LiOH, $Li_2O_3$, $LiNO_3$, $LiNO_2$, $Li_2SO_4$, $LOH \cdot H_2O$, $Li_3PO_4$, LiH, and LiF.

Synthesis of Ni-Containing Lithium Composite Oxide B

Calcination Process

The content of Li in the mixture is preferably 0.8 to 1.2 and more preferably 0.9 to 1.1 in a molar ratio to the total amount of the transition metal. The calcination temperature for the first mixture is preferably 600° C. to 900° C. and more preferably 700° C. to 800° C. The calcination time is, for example, 10 hours to 30 hours. With, for example, the content of Li in the mixture and the calcination temperature that fall within these ranges, the average particle sizes of the primary particles and the secondary particles, the particle breaking load, and the BET specific surface area of the Ni-containing lithium composite oxide B are easily adjusted to the above-described ranges.

Examples of the lithium compound contained in the mixture include $Li_2CO_3$, LiOH, $Li_2O_3$, $Li_2O$, $LiNO_3$, $LiNO_2$, $Li_2SO_4$, $LiOH \cdot H_2O$, LiH, and LiF.

Negative Electrode

The negative electrode 12 includes a negative electrode collector 40 and negative electrode mixture layers 41 that are formed on both sides of the negative electrode collector 40. Examples of the negative electrode collector 40 include foil of metal that is stable in a potential range of the negative electrode 12, such as copper or a copper alloy, and a film having such metal disposed in its surface layer. The negative electrode mixture layers 41 contain a negative electrode active material and a binder. The thickness of the negative electrode mixture layer 41 formed on each side of the collector is, for example, 10 μm to 150 μm. The negative electrode 12 can be prepared by applying negative electrode mixture slurry containing, for example, a negative electrode active material and a binder, to the negative electrode collector 40, drying the coating, and then rolling it to form the negative electrode mixture layers 41 on both sides of the negative electrode collector 40.

The negative electrode active material is any material that is capable of reversibly occluding and releasing lithium ions without any other particular limitation; typically, a carbon material such as graphite is used. Examples of graphite include natural graphite such as flake graphite, massive graphite, and earthy graphite, and artificial graphite such as massive artificial graphite and graphitized mesophase carbon microbeads. Also, metal such as Si or Sn that forms an alloy with Li, a metal compound that contains metal such as Si or Sn, a lithium titanium composite oxide, or another material may be used as the negative electrode active material. For example, a Si-containing compound represented by $SiO_x$ (0.5≤x≤1.6) or a Si-containing compound including Si microparticles dispersed in a lithium silicate phase represented by $Li_{2y}SiO_{(2+y)}$ (0<y<2) may be used in combination with graphite.

Similar to the positive electrode 11, examples of the binder contained in the negative electrode mixture layers 41 include PTFE, PVdF, and other fluorine-containing resins, PAN, polyimides, acrylic resins, and polyolefins, and in a preferred embodiment, styrene-butadiene rubber (SBR) is used. The negative electrode mixture layers 41 may contain, for example, CMC or a salt thereof, polyacrylic acid (PAA) or a salt thereof, or polyvinyl alcohol (PVA). The negative electrode mixture layers 41 contain, for example, SBR and CMC or a salt thereof.

Separator

A porous sheet having ion permeability and insulating properties is used as the separator 13. Specific examples of the porous sheet include a microporous thin film, woven fabric, and nonwoven fabric. Suitable examples of the material for the separator include polyethylene, polypropylene, and other polyolefins and cellulose. The separator 13 may have either a single-layer structure or a multi-layer structure. The separator 13 may have, on its surface, a high heat resistance resin layer of, for example, an aramid resin and a filler layer that contains an inorganic compound filler.

Non-Aqueous Electrolyte

The non-aqueous electrolyte includes a non-aqueous solvent and electrolyte salt dissolved in the non-aqueous solvent. Examples of the non-aqueous solvent include esters, ethers, nitriles such as acetonitrile, amides such as dimethylformamide, and mixed solvents of two or more thereof. The non-aqueous solvent may contain a halogen substitution product of these solvents in which hydrogens of the solvents are, at least in part, substituted with a halogen atom such as fluorine. Examples of the halogen substitution product include fluorinated cyclic carbonate esters such as fluoroethylene carbonate (FEC), fluorinated chain carbonate esters, and fluorinated chain carboxylate esters such as methyl fluoropropionate (FMP).

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, LiCl, LiBr, LiI, lithium chloroborane, lithium lower aliphatic carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {where l and m are integers of 0 or greater}. One of these lithium salts may be used alone, or two or more of these lithium salts may be used as a mixture. Among these, $LiPF_6$ is preferably used in terms of, for example, ionic conductivity and electrochemical stability. The concentration of the lithium salt is, for example, 0.8 mol to 1.8 mol per liter of the non-aqueous solvent.

EXAMPLES

The present disclosure will be further described below with reference to examples, but the present disclosure is not limited to the following examples.

Example 1

Synthesis of Ni-Containing Lithium Composite Oxide A1

After LiOH and $Ni_{0.80}Co_{0.10}Mn_{0.10}(OH)_2$ were mixed so that the molar ratio of Li to the total amount of Ni, Co, and Mn was 0.90, this mixture was kept at 900° C. for 5 hours (first calcination step) to obtain a first calcined product of a Ni-containing lithium composite oxide. Next, LiOH and the first calcined product were mixed so that the molar ratio of Li to the total amount of Ni, Co, and Mn was 0.15 mol. This mixture was kept at 750° C. for 10 hours (second calcination step) to obtain a Ni-containing lithium composite oxide (second calcined product).

The Ni-containing lithium composite oxide A1 comprised secondary particles that were aggregates of primary particles. The primary particles of the Ni-containing lithium composite oxide A1 had an average particle size of 3.1 μm, and the secondary particles of the Ni-containing lithium composite oxide A1 had an average particle size of 4.3 μm. The average particle sizes were measured by the above-described method. The Ni-containing lithium composite oxide A1 had a particle breaking load of 20 mN and a BET specific surface area of 0.7 $m^2$/g. The particle breaking load and the BET specific surface area were measured by the above-described methods. As a result of calculation through ICP emission spectrometry (using an ICP emission spectrometer iCAP6300 manufactured by Thermo Fisher Scientific), the composition of the Ni-containing lithium composite oxide A1 was determined to be $Li_{1.05}Ni_{0.80}Co_{0.10}Mn_{0.10}O_2$.

Synthesis of Ni-Containing Lithium Composite Oxide B1

After LiOH and $Ni_{0.80}Co_{0.10}Mn_{0.10}(OH)_2$ were mixed so that the molar ratio of Li to the total amount of Ni, Co, and Mn was 1.05, this mixture was kept at 780° C. for 20 hours to obtain a Ni-containing lithium composite oxide B1.

Similar to the Ni-containing lithium composite oxide A1, the Ni-containing lithium composite oxide B1 comprised secondary particles that were aggregates of primary particles. The primary particles of the Ni-containing lithium composite oxide B1 had an average particle size of 0.5 μm, and the secondary particles of the Ni-containing lithium composite oxide B1 had an average particle size of 13.1 μm. The average particle sizes were measured by the above-described method. The Ni-containing lithium composite oxide B1 had a particle breaking load of 30 mN and a BET specific surface area of 0.3 $m^2$/g. The particle breaking load and the BET specific surface area were measured by the above-described methods. As a result of calculation through ICP emission spectrometry, the composition of the Ni-containing lithium composite oxide B1 was determined to be $Li_{1.05}Ni_{0.80}Co_{0.10}Mn_{0.10}O_2$.

Preparation of Positive Electrode

A mixture of the Ni-containing lithium composite oxides A1 and B1 in a mass ratio of 3:7 was used as a positive electrode active material. Positive electrode mixture slurry was prepared by mixing 97.5% by mass of the positive electrode active material, 1% by mass of carbon black, and 1.5% by mass of polyvinylidene fluoride and then mixing the resulting mixture with N-methyl-2-pyrrolidone (NMP). This slurry was applied to both sides of positive electrode collector composed of 15 μm thick aluminum foil by a doctor blade method, and after the coating was dried, the coating was rolled using a rolling roller at a pressure of 500 MPa to prepare a positive electrode having positive electrode mixture layers on both sides of the positive electrode collector. A center portion of the positive electrode collector as viewed in the length direction included a portion where the positive electrode mixture layers were absent, and a positive electrode tab was attached to this portion. The thickness of each of the positive electrode mixture layers was about 140 μm, and the thickness of the positive electrode was about 300 μm.

Preparation of Negative Electrode

Negative electrode mixture slurry was prepared by mixing 98.2% by mass of graphite, 0.7% by mass of styrene-butadiene rubber, and 1.1% by mass of sodium carboxymethylcellulose and mixing the resulting mixture with water. This slurry was applied to both sides of a negative electrode collector composed of 8 μm thick copper foil by a doctor blade method, and after the coating was dried, the coating was rolled using a rolling roller to prepare a negative electrode having negative electrode mixture layers on both sides of the negative electrode collector. Each end of the negative electrode collector as viewed in the length direction included a portion where the negative electrode mixture layers were absent, and a negative electrode tab was attached to this portion. The thickness of each of the negative electrode mixture layers was about 120 μm, and the thickness of the negative electrode was about 250 μm.

Formulation of Non-Aqueous Electrolyte Solution

Ethylene carbonate (EC) and diethyl carbonate (DEC) were mixed in equal volumes, and $LiPF_6$ was dissolved in the resulting non-aqueous solvent in a concentration of 1.6 mol/L to prepare a non-aqueous electrolyte solution.

Preparation of Non-Aqueous Electrolyte Secondary Battery

A non-aqueous electrolyte secondary battery was prepared using the above-described positive electrode, the above-described negative electrode, the above-described non-aqueous electrolyte solution, and a separator through the following steps.

(1) The positive electrode and the negative electrode were wound together with the separator therebetween to prepare an electrode assembly having a wound configuration.

(2) The wound electrode assembly was housed in a cylindrical battery outer can having a diameter of 18 mm and a height of 65 mm with insulating plates being respectively disposed on upper and lower sides of the electrode assembly.

(3) The collector tab of the negative electrode was welded to the inner surface of the bottom of the battery outer can, and the collector tab of the positive electrode was welded to the bottom plate of the sealing assembly.

(4) The non-aqueous electrolyte solution was injected through the opening of the battery outer can, and then the battery outer can was hermetically sealed by the sealing assembly.

The performance of the above-described non-aqueous electrolyte secondary battery was evaluated by the following methods. The evaluation results are given in Table 3.

Evaluation of Discharge Capacity

The discharge capacity (mAh) of the above-described non-aqueous electrolyte secondary battery was determined by charging the non-aqueous electrolyte secondary battery at a constant current of 1 It=2900 mA under an environment of 25° C. until the battery voltage reached 4.2 V, and then discharging the non-aqueous electrolyte secondary battery at a constant current of 1 It until the battery voltage reached 2.5 V.

Evaluation of Capacity Retention Rate

The capacity retention rate of the above-described non-aqueous electrolyte secondary battery was determined by charging and discharging the non-aqueous electrolyte secondary battery under a temperature condition of 25° C. and under the following conditions.

Charge/Discharge Conditions

Charge: A constant current charging was performed at a constant current of 1 It=2900 mA until the battery voltage reached 4.2 V. Additionally, a constant voltage charging was performed at a voltage of 4.2 V until the current value reached 145 mA.

Discharge: A constant current discharging was performed at a constant current of 1 It until the voltage reached 2.5 V.

This charge/discharge cycle was performed 100 times, and the capacity retention rate was calculated by the following equation.

Capacity retention rate (%) 100th cycle discharge capacity/first cycle discharge capacity×100

Synthesis of Ni-Containing Lithium Composite Oxides A2 to A5

The amount of Li added and the calcination temperature were changed to the conditions listed in Table 1, and other than that, Ni-containing lithium composite oxides A2 to A5 were synthesized in a similar manner to that in which the Ni-containing lithium composite oxide A1 was synthesized. The average primary particle size, the average secondary particle size, the particle breaking load, and the BET specific surface area of each of the obtained composite oxides are given in Table 1.

| | Ni-containing lithium composite oxide A | | | | | | | |
|---|---|---|---|---|---|---|---|---|
| | Synthesis conditions | | | | | | | BET |
| | First calcination step | | Second calcination step | | | | Particle | specific |
| | Li molar ratio | Calcination temperature (° C.) | Li molar ratio | Calcination temperature (° C.) | Primary particle size (μm) | Secondary particle size (μm) | breaking load (mN) | surface area (m²/g) |
| A1 | 0.90 | 900 | 0.15 | 750 | 3.1 | 4.3 | 20 | 0.7 |
| A2 | 0.90 | 800 | 0.15 | 750 | 2.0 | 4.1 | 5 | 1.0 |
| A3 | 0.90 | 950 | 0.15 | 750 | 4.4 | 4.5 | 35 | 0.5 |
| A4 | 0.90 | 780 | 0.15 | 750 | 1.9 | 4.0 | 4 | 1.1 |
| A5 | 0.90 | 1000 | 0.15 | 750 | 4.9 | 4.9 | 40 | 0.4 |

Synthesis of Ni-Containing Lithium Composite Oxides B2 to B5

The particle size of Ni raw material and the calcination temperature were changed to the conditions listed in Table 2, and other than that, Ni-containing lithium composite oxides B2 to B5 were synthesized in a similar manner to that in which the Ni-containing lithium composite oxide B1 was synthesized. The average primary particle size, the average secondary particle size, the particle breaking load, and the BET specific surface area of each of the obtained composite oxides are given in Table 2.

| | Ni-containing lithium composite oxide B | | | | |
|---|---|---|---|---|---|
| | Synthesis conditions | | Primary | | Particle | BET specific |
| | Raw material particle size (μm) | Calcination temperature (° C.) | particle size (μm) | Secondary particle size (μm) | breaking load (mN) | surface area (m²/g) |
| B1 | 13.0 | 780 | 0.5 | 13.1 | 30 | 0.3 |
| B2 | 13.0 | 850 | 1.0 | 13.0 | 10 | 0.1 |
| B3 | 13.0 | 750 | 0.2 | 13.0 | 35 | 1.0 |
| B4 | 13.0 | 900 | 1.5 | 12.9 | 8 | 0.09 |
| B5 | 13.0 | 700 | 0.3 | 13.3 | 40 | 1.2 |

Examples 2 to 9 and Comparative Examples 1 to 10

A non-aqueous electrolyte secondary battery was prepared in a similar manner to Example 1 except that a mixture of Ni-containing lithium composite oxides A and B listed in Table 3 in a mass ratio listed in Table 3 was used as the positive electrode active material. The performance of the battery was evaluated. The evaluation results are given in Table 3.

| | Composite oxide A | Composite oxide B | Mass ratio A:B | Discharge capacity (mAh) | Capacity retention rate (%) |
|---|---|---|---|---|---|
| Example 1 | A1 | B1 | 4:6 | 2920 | 95 |
| Example 2 | A1 | B2 | 4:6 | 2910 | 90 |
| Example 3 | A1 | B3 | 4:6 | 2900 | 96 |
| Example 4 | A2 | B1 | 4:6 | 2930 | 94 |
| Example 5 | A2 | B2 | 4:6 | 2940 | 93 |
| Example 6 | A2 | B3 | 4:6 | 2920 | 95 |
| Example 7 | A3 | B1 | 4:6 | 2910 | 96 |
| Example 8 | A3 | B2 | 4:6 | 2920 | 94 |
| Example 9 | A3 | B3 | 4:6 | 2900 | 97 |
| Comparative Example 1 | A1 | B4 | 4:6 | 2910 | 82 |
| Comparative Example 2 | A1 | B5 | 4:6 | 2820 | 96 |
| Comparative Example 3 | A2 | B4 | 4:6 | 2940 | 80 |
| Comparative Example 4 | A2 | B5 | 4:6 | 2840 | 90 |
| Comparative Example 5 | A3 | B4 | 4:6 | 2930 | 82 |
| Comparative Example 6 | A3 | B5 | 4:6 | 2840 | 96 |
| Comparative Example 7 | A4 | B4 | 4:6 | 2950 | 61 |
| Comparative Example 8 | A4 | B5 | 4:6 | 2800 | 79 |
| Comparative Example 9 | A5 | B4 | 4:6 | 2790 | 78 |
| Comparative Example 10 | A5 | B5 | 4:6 | 2720 | 97 |

As shown in Table 3, the discharge capacity and the capacity retention rate of the batteries of the examples were high. In contrast, none of the batteries of the comparative examples satisfied these characteristics.

REFERENCE SIGNS LIST 10 non-aqueous electrolyte secondary battery
11 positive electrode
12 negative electrode
13 separator
14 electrode assembly
15 battery case
16 outer can
17 sealing assembly
18, 19 insulating plate
20 positive electrode tab
21 negative electrode tab
22 groove or inward projection
23 bottom plate
24 lower vent member
25 insulating member
26 upper vent member
27 cap
28 gasket
30 positive electrode collector
31 positive electrode mixture layer
32, 33 primary particle
40 negative electrode collector
41 negative electrode mixture layer

The invention claimed is:

1. A positive electrode active material for a non-aqueous electrolyte secondary battery comprising a Ni-containing lithium composite oxide A and a Ni-containing lithium composite oxide B, wherein
the Ni-containing lithium composite oxide A and the Ni-containing lithium composite oxide B contain Ni in an amount of 55 mol % or more relative to the total number of moles of one or more metal elements excluding Li,
the Ni-containing lithium composite oxide A has an average primary particle size of 2 μm or greater, an average secondary particle size of 2 μm to 6 μm, a particle breaking load of 5 mN to 35 mN, and a BET specific surface area of 0.5 m2/g to 1.0 m2/g, and
the Ni-containing lithium composite oxide B has an average primary particle size of 1 μm or less, an average secondary particle size of 10 μm to 20 μm, a particle breaking load of 10 mN to 35 mN, and a BET specific surface area of 0.1 m2/g to 1.0 m2/g.

2. The positive electrode active material for a non-aqueous electrolyte secondary battery according to claim 1, wherein the Ni-containing lithium composite oxide A and the Ni-containing lithium composite oxide B contain at least one of Co and Mn and contain at least one metal element selected from Mg, Zr, Mo, W, Nb, Al, Cr, V, Ce, Ti, Fe, Si, K, Ga, In, and B.

3. The positive electrode active material for a non-aqueous electrolyte secondary battery according to claim 1, wherein the Ni-containing lithium composite oxide A and the Ni-containing lithium composite oxide B contain Ni in an amount of 80 mol % or more.

4. A non-aqueous electrolyte secondary battery comprising:
- a positive electrode containing the positive electrode active material for a non-aqueous electrolyte secondary battery according to claim 1;
- a negative electrode; and
- a non-aqueous electrolyte.

* * * * *